US009592957B2

(12) United States Patent
Rajewski et al.

(10) Patent No.: US 9,592,957 B2
(45) Date of Patent: Mar. 14, 2017

(54) COLLECTION AND DELIVERY VEHICLE

(71) Applicants: David Rajewski, Spokane, WA (US); Rocky Rajewski, Airway Heights, WA (US)

(72) Inventors: David Rajewski, Spokane, WA (US); Rocky Rajewski, Airway Heights, WA (US)

(*) Notice: Subject to any disclaimer, the term of this patent is extended or adjusted under 35 U.S.C. 154(b) by 0 days.

(21) Appl. No.: 14/508,791

(22) Filed: Oct. 7, 2014

(65) Prior Publication Data

US 2015/0098777 A1 Apr. 9, 2015

Related U.S. Application Data

(60) Provisional application No. 61/888,320, filed on Oct. 8, 2013.

(51) Int. Cl.

| | |
|---|---|
| ***B65G 65/34*** | (2006.01) |
| ***B65F 3/00*** | (2006.01) |
| ***B65F 3/02*** | (2006.01) |
| ***B65F 3/08*** | (2006.01) |
| ***B65F 3/12*** | (2006.01) |
| ***B65F 3/14*** | (2006.01) |

(52) U.S. Cl.

CPC ............ *B65F 3/001* (2013.01); *B65F 3/0213* (2013.01); *B65F 3/08* (2013.01); *B65F 3/12* (2013.01); *B65F 3/14* (2013.01); *B65F 2003/023* (2013.01)

(58) Field of Classification Search

CPC ........ B65F 3/001; B65F 3/0213; B65F 1/004; B65F 1/0046; B65F 3/02; B65F 2001/008; B65G 65/32

See application file for complete search history.

(56) References Cited

U.S. PATENT DOCUMENTS

| | | | | |
|---|---|---|---|---|
| 4,227,849 | A * | 10/1980 | Worthington | 414/408 |
| 4,516,285 | A * | 5/1985 | Pineau | 15/84 |
| 4,786,003 | A * | 11/1988 | Johnson | 241/101.741 |
| 5,226,757 | A * | 7/1993 | Tarrant | 406/39 |
| 5,344,273 | A * | 9/1994 | Radlein | 414/409 |
| 5,772,384 | A * | 6/1998 | Richards | 414/408 |
| 6,752,583 | B2 * | 6/2004 | Rajewski | 414/502 |
| 2013/0259614 | A1 * | 10/2013 | Vasilescu | B65F 3/14 414/406 |

* cited by examiner

*Primary Examiner* — Michael McCullough
*Assistant Examiner* — Mark Hageman
(74) *Attorney, Agent, or Firm* — Wells St. John, P.S.

(57) ABSTRACT

This invention includes embodiments which disclose a collection and delivery vehicle with a cab portion, a chassis and a container box. The container box includes a lift mechanism, a material storage area which may include multiple individual storage areas, some dual use, and a conveyor, auger or other desirable material handling mechanism to receive the material from bins and move it to the material storage area and/or storage containers from above.

5 Claims, 20 Drawing Sheets

COLLECTION AND DELIVERY VEHICLE

CROSS REFERENCE TO RELATED APPLICATION

This application claims the benefit of the filing date of and priority to U.S. Provisional Application No. 61/888,320, filed Oct. 8, 2013.

TECHNICAL FIELD

This invention generally relates to an improved collection and delivery vehicle collecting a variety of different types of material.

BACKGROUND OF THE INVENTION

There had been numerous different types of collection and delivery vehicles used over the past several decades, and more recently a number of different collection vehicles that have automatic container lifting and dumping mechanisms. The efficiency and storage capacity of these vehicles is becoming more and more critical in the collection industry as many of the existing fleets and vehicles are very inefficient and have limited capacity for the footprint and/or size of the vehicle.

There is also a need for such collection and delivery trucks to provide the user flexibility in how the space and compartments in the truck are used. For example in some instances the space within the entire truck may be needed to receive the material being loaded and hauled; however, in other situations and collection trips, part of the footprint or storage capacity may be needed to haul other items such as garbage bins, equipment or other material/things which must be kept separate from the material being loaded and hauled. Embodiments of this invention provide advantageous dual use compartments to allow certain storage/receiving areas to be used to receive the material being loaded and hauled in some instances, but can also be sealed off from the loading system (conveyor for example) and used for other purposes in other instances, i.e. dual purpose areas.

It is therefore an object of embodiments of this invention to provide a collection and delivery vehicle that includes an automated lifting and depositing mechanism combined with a more efficient depositing system to increase the efficiency and capacity as compared to prior art collection vehicles, at the top portion of the storage space.

An advantage of embodiments of this invention are that they significantly increase the volume of material that can practically be loaded into the container box, thus increasing efficiency and saving money.

While the invention was motivated in addressing some objectives, it is in no way so limited. The invention is only limited by the accompanying claims as literally worded, without interpretative or other limiting reference to the specification, and in accordance with the doctrine of equivalents. Other objects, features, and advantages of this invention will appear from the specification, claims, and accompanying drawings which form a part hereof. In carrying out the objects of this invention, it is to be understood that its essential features are susceptible to change in design and structural arrangement, with only one practical and preferred embodiment being illustrated in the accompanying drawings, as required.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an" and "the" as used in the claims herein are used in conformance with long-standing claim drafting practice and not in a limiting way. Unless specifically set forth herein, the terms "a", "an" and "the" are not limited to one of such elements, but instead mean "at least one".

Figure 1:
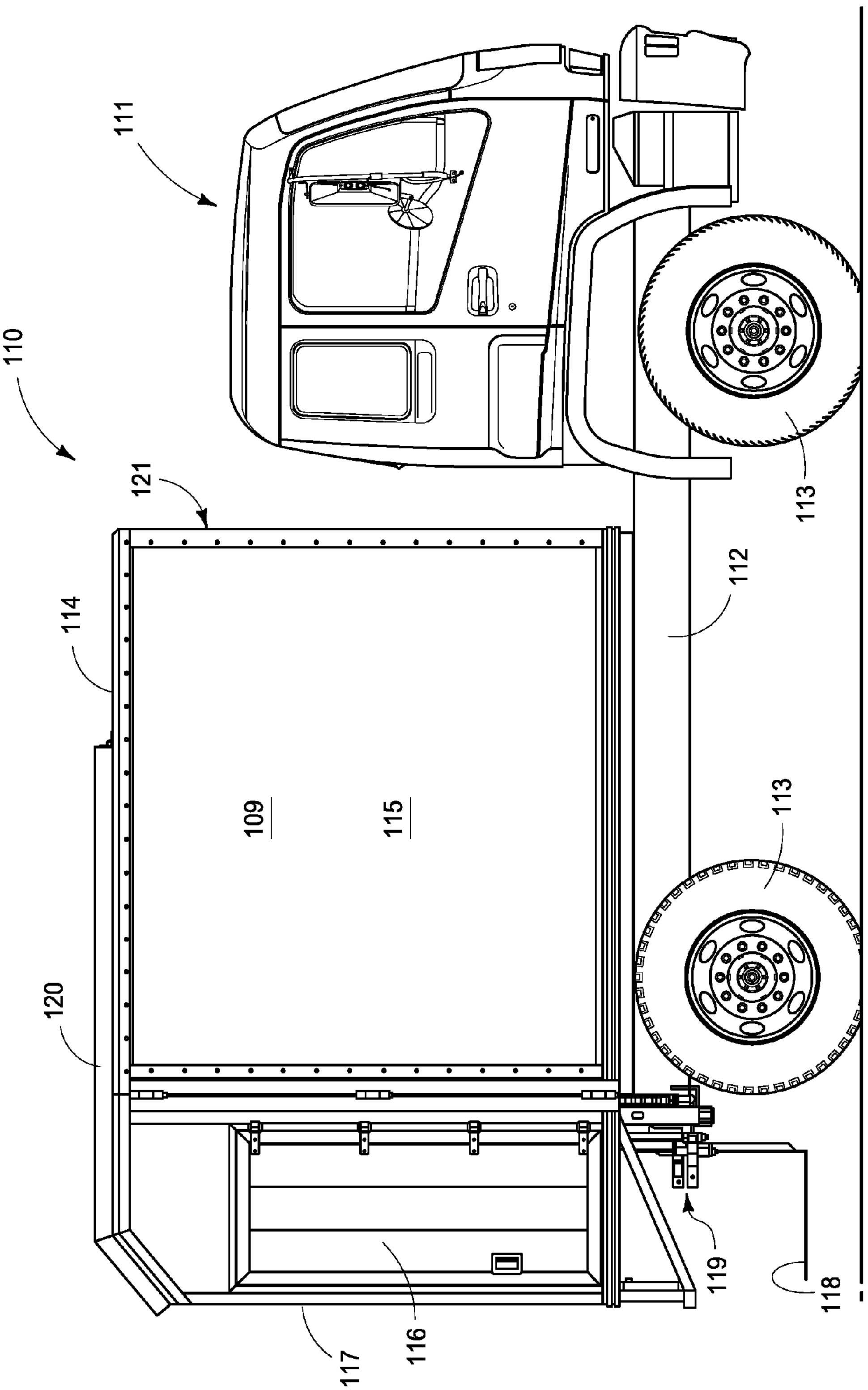
FIG. 1 is an elevation view of one example of the depiction of a collection and delivery vehicle contemplated by an embodiment of this invention.

FIG. 1 is an elevation view of one example of the depiction of a collection and delivery vehicle 110 contemplated by one embodiment of this invention, showing the cab 111, chassis 112, and wheels 113. The box portion 109 of the vehicle 110 may have a framework 114, and may be mounted relative to the cab in any one of a number of different ways, such as mounted on the frame portion 112 of the chassis. FIG. 1 further shows the side 115 of the box portion 109, lift mechanism 119 with lift or bin platform 118, lift hood 120, front end 121 and rear end 117 of box portion 109 are further illustrated. Door 116 provides access to a bin storage area in some aspects of this invention.

It will be appreciated by those of ordinary skill in the art and viewing the drawings that when a storage container or bin is placed on the bin platform 118, lift mechanism 119 begins to lift the storage container or bin, and as the storage container or bin is lifted, lift hood 120 is raised to allow sufficient clearance so that the hood is lifted high enough such that there is sufficient clearance for the bin to be rotated 90 degrees or more to allow the contents of the storage container or bin to move toward and/or be dumped onto a conveyor, auger or other material moving mechanism depending on the embodiment of the invention.

A typical collection and delivery vehicle may include (without limitation): a vehicle chassis; at least four wheels rotatably attached to said vehicle chassis; a driver's cab directly or indirectly attached to said vehicle chassis; a container box with a framework mounted to said vehicle chassis; a bin lift mechanism mounted to the container box and disposed to receive a bin containing material, lift the material bin to a top portion of the container box, and deposit the material from the bin to a material transport device at the top portion of the container box; and wherein the material transport device is configured to transport the material from a top portion of the container box and deposit the material into a material storage area within the container box.

Figure 2:
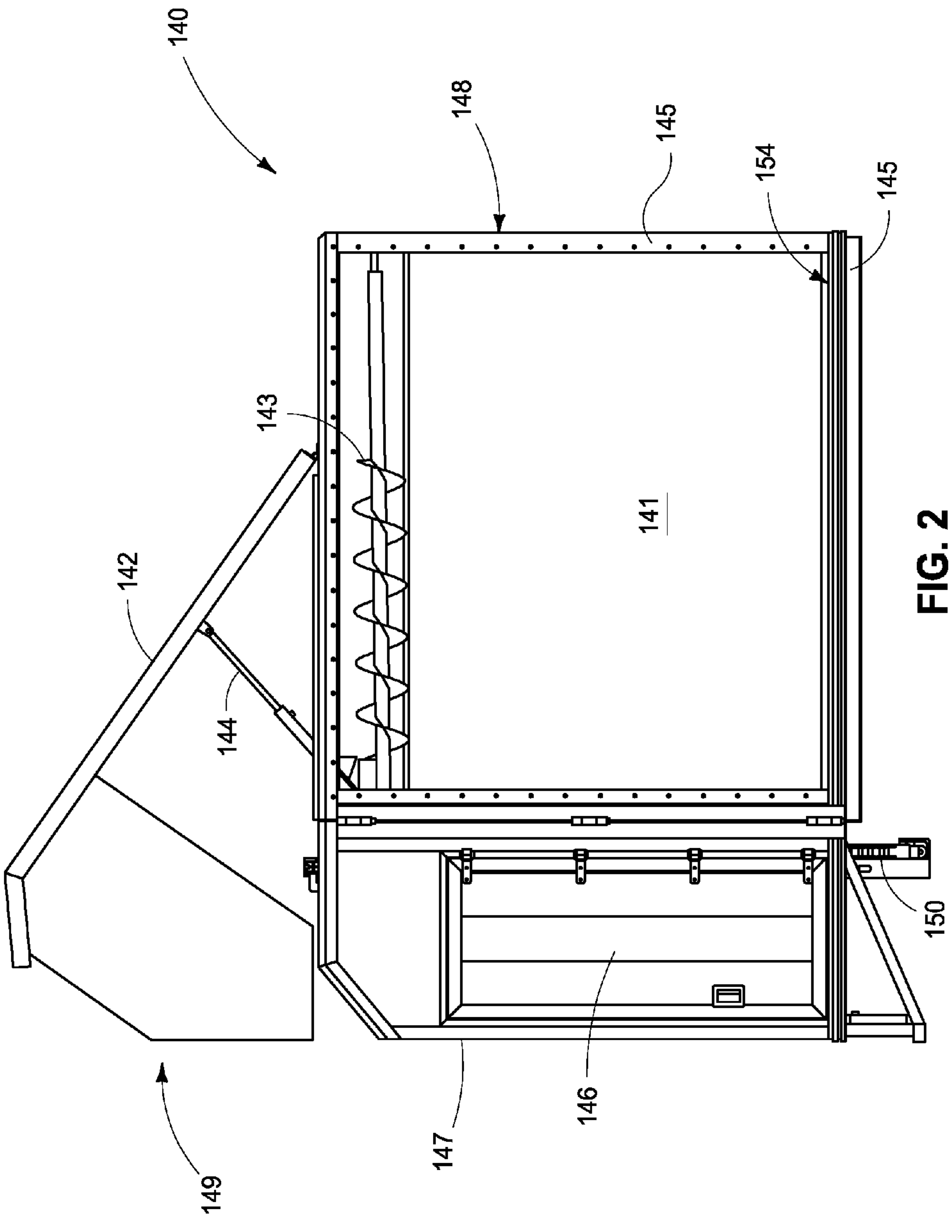
FIG. 2 is an elevation view of an example of an embodiment of a container and lift system which may be utilized in combination with a vehicle as contemplated by this invention, illustrating the use of a lift and an auger supplying the material storage area without any separate containers therein.

FIG. 2 is an elevation view of an example of an embodiment of a container and lift system 140 which may be utilized in combination with a vehicle as contemplated by this invention, illustrating the use of a lift mechanism 150 and augers 143 supplying the single material storage area 141 without any separate containers therein. FIG. 2 illustrates front end 148 and rear end 147 of the container system, lift mechanism 150, overhead lift cover system 149, lift hood 142, and lift hood hydraulic ram 144 to raise and lower lift hood 142. The box portion of the container and lift system 140 may include any one of a number of different types of framework 145 within the contemplation of this invention. The side door 146 at the rear end of the container and lift system 140 provides access to bin storage and other interior features.

It will be appreciated by those of skill in the art that while a lift mechanism 150 is generally identified and described, there are multiple types of lift mechanisms which may be utilized within the contemplation of this invention, with no one configuration or mechanism being required to practice this invention.

Figure 3:
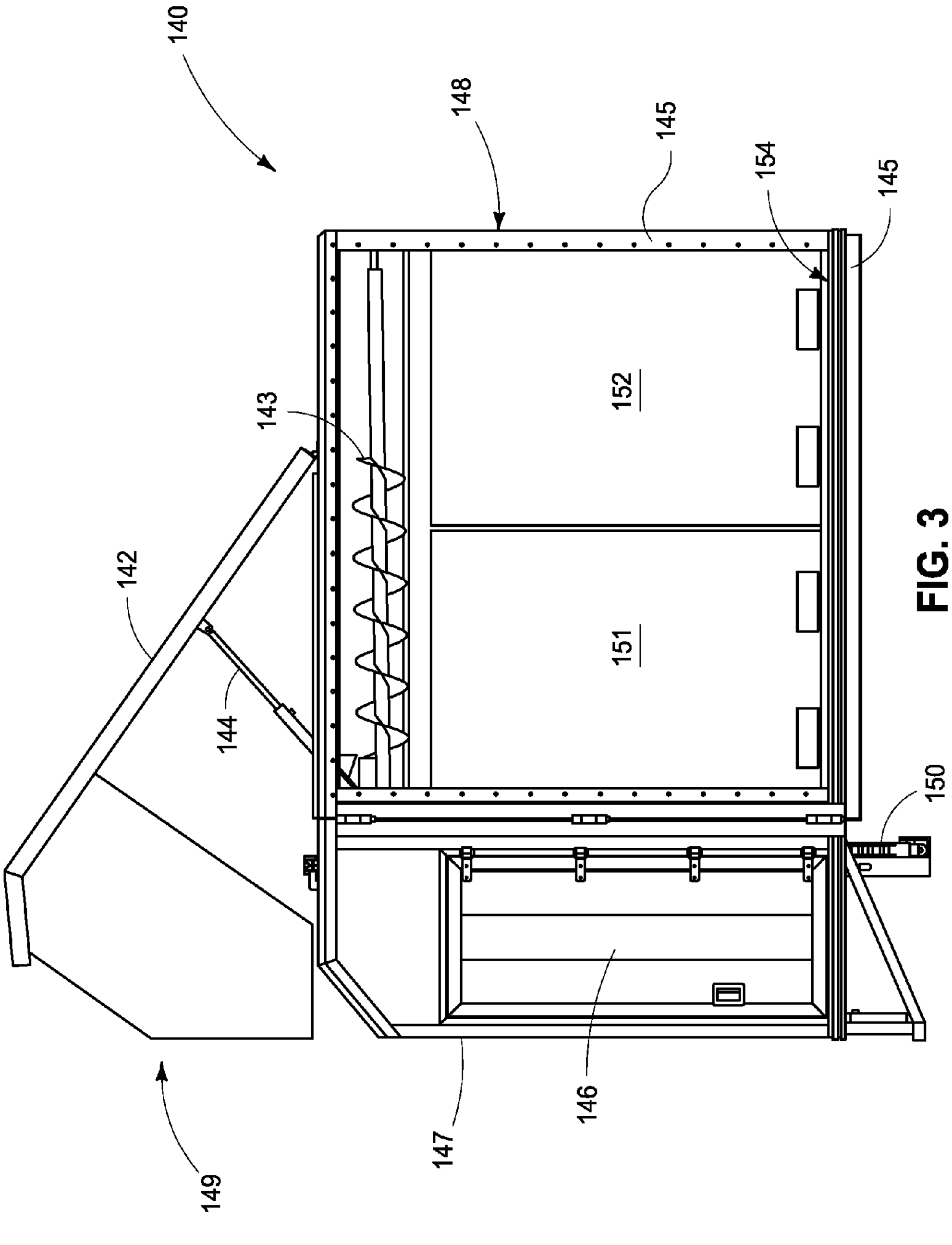
FIG. 3 is an elevation view of an example of an embodiment of a container and lift system which may be utilized in combination with a vehicle as contemplated by this invention, illustrating the use of a lift and an auger supplying multiple separate containers within the material storage area.

FIG. 3 is an elevation view of an example of an embodiment of a container and lift system 140 which may be utilized in combination with a vehicle as contemplated by this invention, illustrating the use of a lift mechanism 150 and augers 143 which supply multiple separate containers 151 and 152 within the material storage area. FIG. 3 illustrates front end 148 and rear end 147 of the container system, lift mechanism 150, overhead lift cover system 149, lift hood 142, and lift hood hydraulic ram 144 to raise and lower lift hood 142. The box portion of the container and lift system 140 may include any one of a number of different types of framework 145 within the contemplation of this invention. The side door 146 at the rear end of the container and lift system 140 provides access to bin storage and other interior features.

Figure 4:
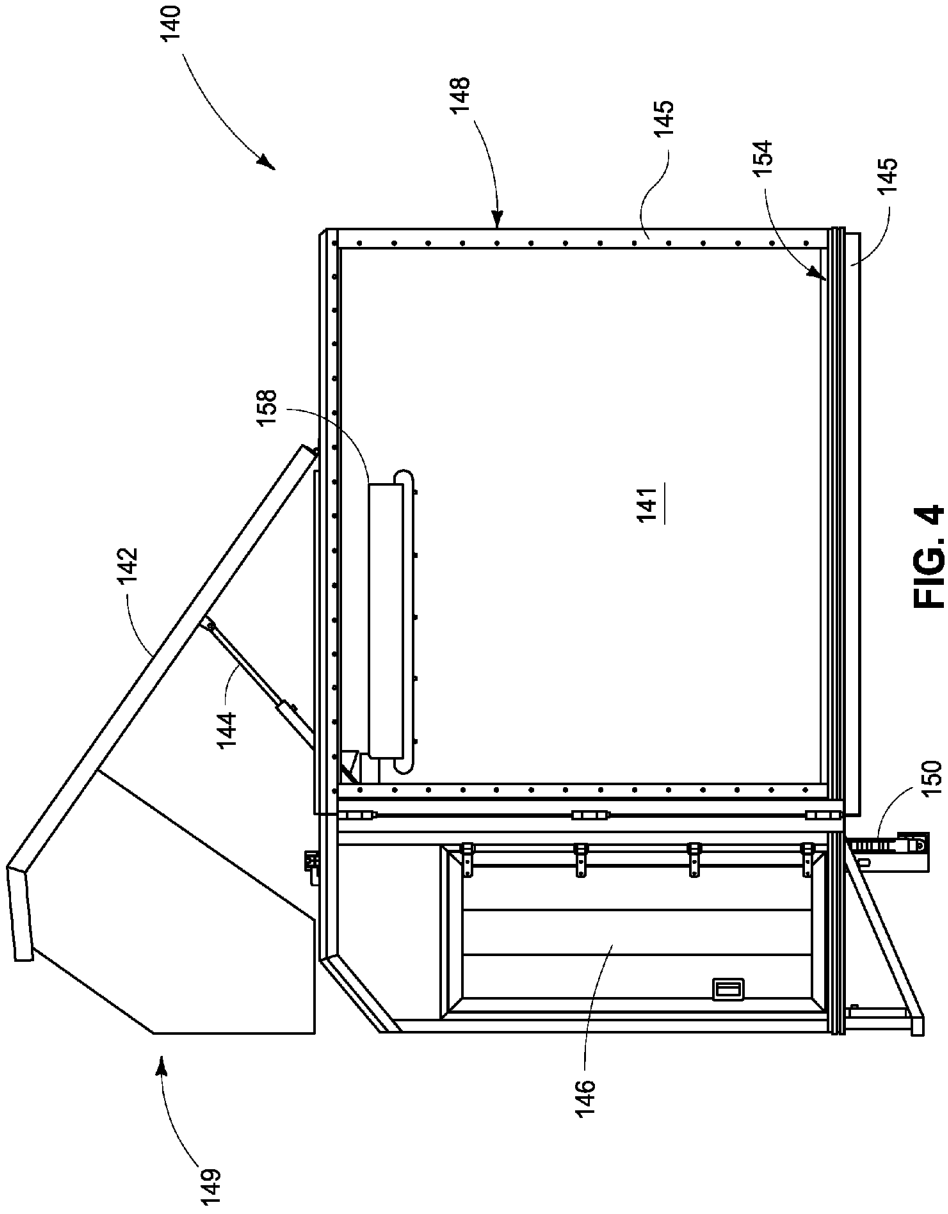
FIG. 4 is an elevation side view of an example of an embodiment of a container and lift system which may be utilized in combination with a vehicle as contemplated by this invention, illustrating the use of a lift mechanism and a conveyor supplying the material storage area without any separate containers therein.

FIG. 4 is an elevation side view of an example of an embodiment of a container and lift system 140 which may be utilized in combination with a vehicle as contemplated by this invention, illustrating the use of a lift mechanism 150 and a conveyor 158 supplying the single material storage area 141. FIG. 4 illustrates front end 148 and rear end 147 of the container system, lift mechanism 150, overhead lift cover system 149, lift hood 142, and lift hood hydraulic ram 144 to raise and lower lift hood 142. The box portion of the container and lift system 140 may include any one of a number of different types of framework 145 within the contemplation of this invention. The side door 146 at the rear end of the container and lift system 140 provides access to bin storage and other interior features.

Figure 5:
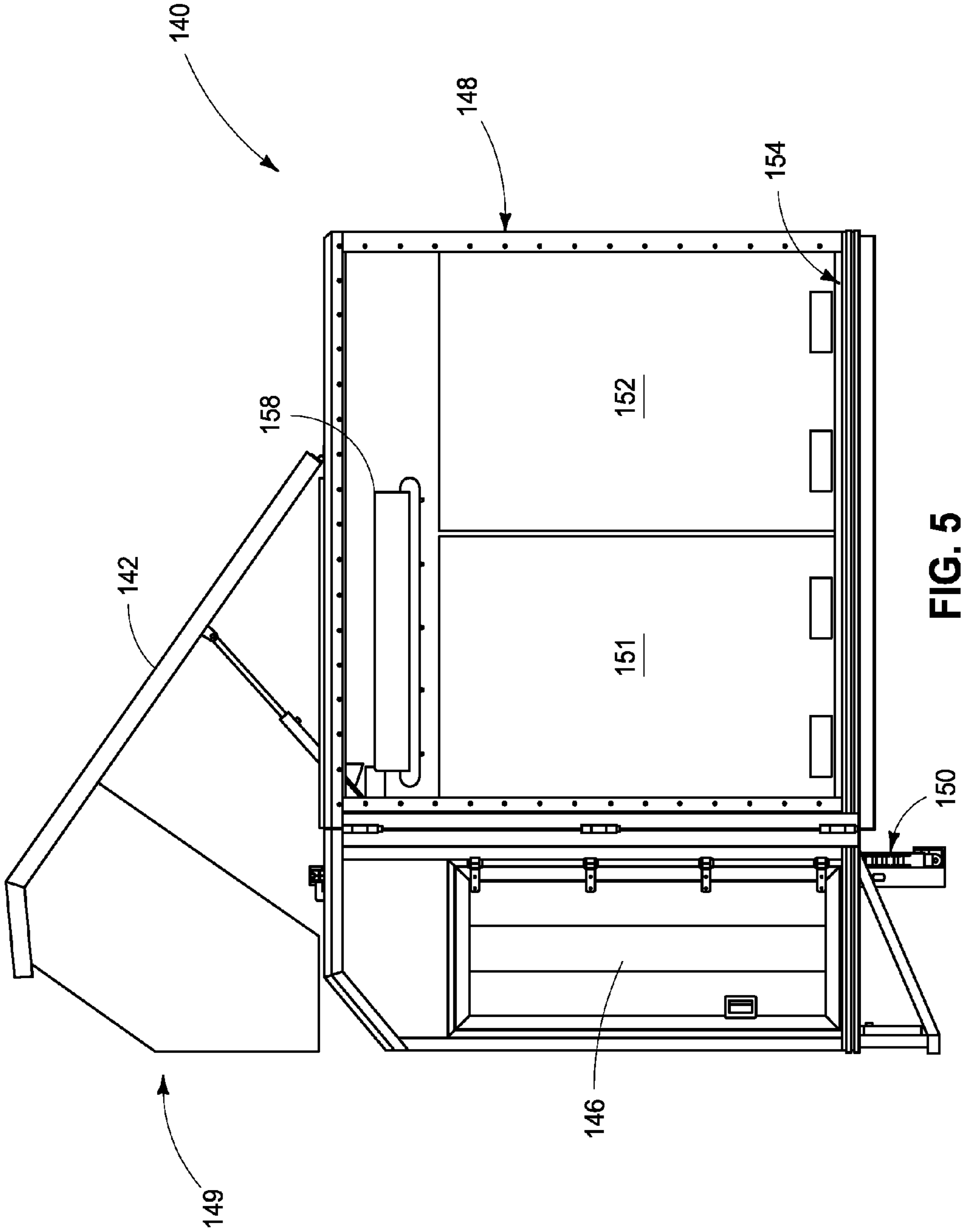
FIG. 5 is an elevation side view of an example of an embodiment of a container and lift system which may be utilized in combination with a vehicle as contemplated by this invention, illustrating the use of a lift mechanism and a conveyor supplying multiple containers within the material storage area.

FIG. 5 is an elevation side view of an example of an embodiment of a container and lift system 140 which may be utilized in combination with a vehicle as contemplated by this invention, illustrating the use of a lift mechanism 150 and a conveyor 158 supplying multiple containers 151 and 152, within the material storage area of the container. FIG. 5 further illustrates front end 148 and rear end 147 of the container system, lift mechanism 150, overhead lift cover system 149, lift hood 142, and lift hood hydraulic ram 144 to raise and lower lift hood 142. The box portion of the container and lift system 140 may include any one of a number of different types of framework 145 within the contemplation of this invention. The side door 146 at the rear end of the container and lift system 140 provides access to bin storage and other interior features.

Figure 6:
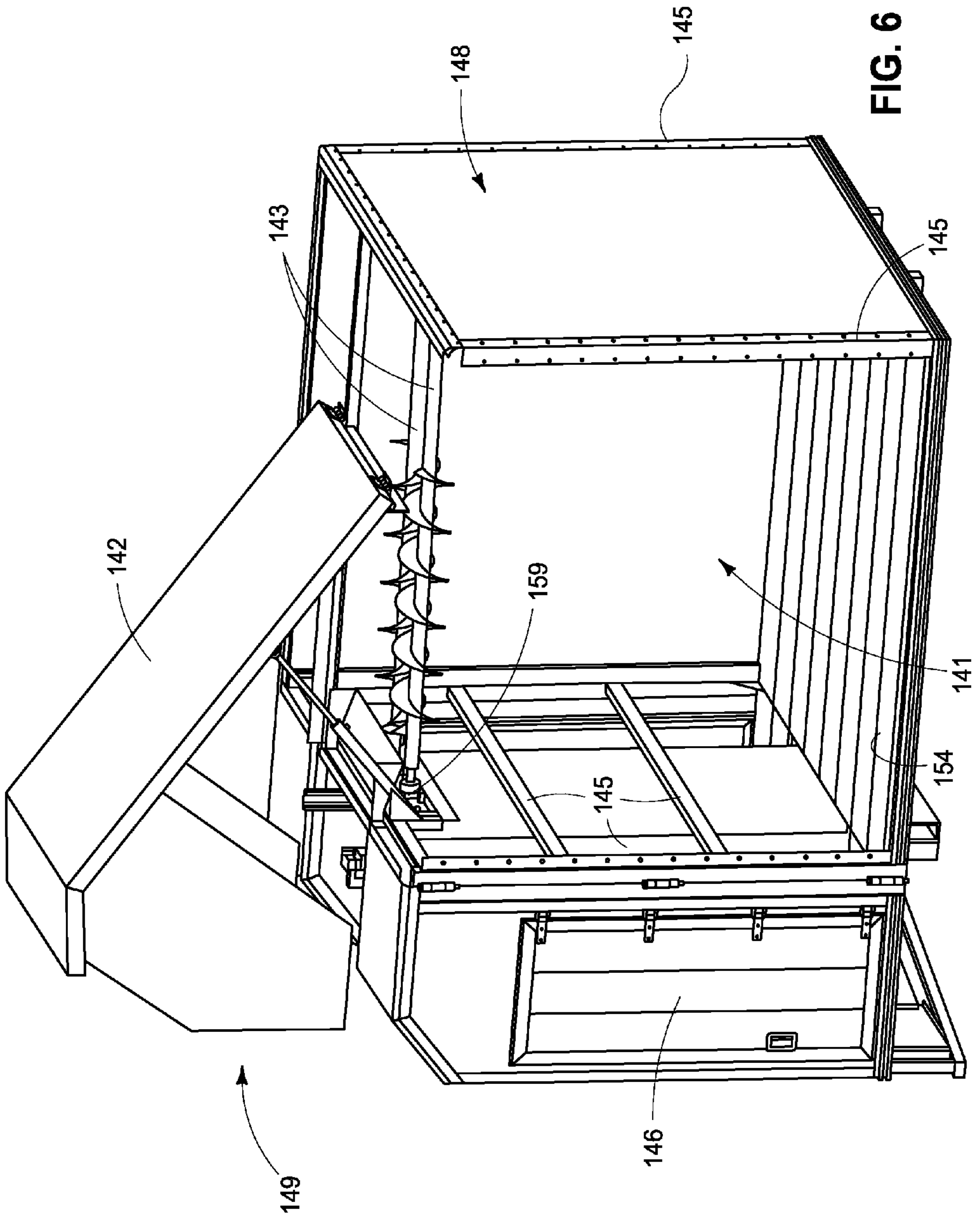
FIG. 6 is an elevation perspective view of an example of an embodiment of a container and lift system which may be utilized in combination with a vehicle as contemplated by this invention, illustrating the use of one or more augers to move material to the material storage area and utilized without separate storage containers within the material storage.

FIG. 6 is an elevation perspective view of an example of an embodiment of a container and lift system 140 which may be utilized in combination with a vehicle as contemplated by this invention, illustrating the use of one or more augers 143 to move material to the material storage area 141 and utilized without separate storage containers within the material storage area 141. FIG. 6 illustrates front end 148 and rear end 147 of the container system, lift mechanism 150, overhead lift cover system 149, lift hood 142, and lift hood hydraulic ram 144 to raise and lower lift hood 142. The box portion of the container and lift system 140 may include any one of a number of different types of framework 145 within the contemplation of this invention. The side door 146 at the rear end of the container and lift system 140 provides access to bin storage and other interior features. FIG. 6 further identifies floor 154 within the material storage area, wherein said floor may be a traditional type of floor (such as a wood floor) or a walking or moving (active) floor which would be utilized to move or unload material from the material storage area 141.

Figure 7:
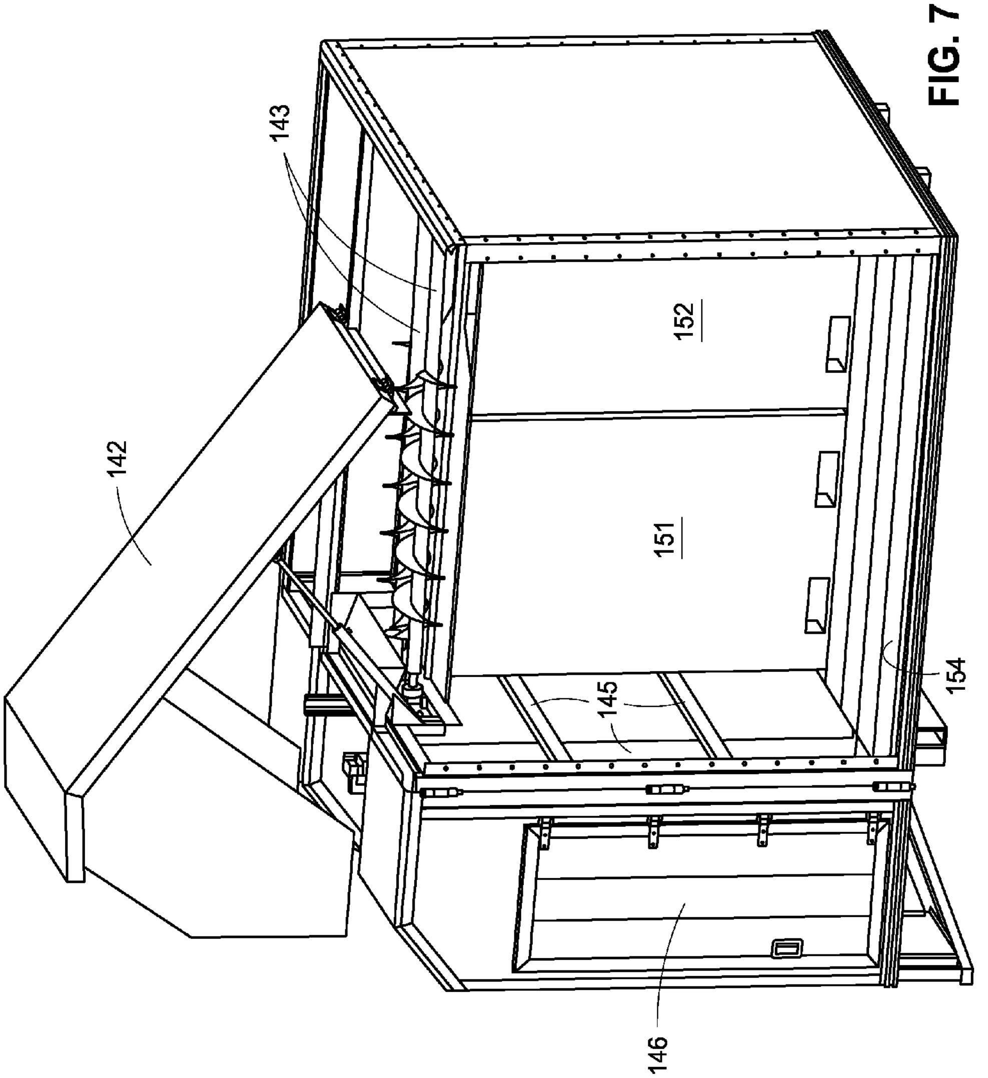
FIG. 7 is an elevation perspective view of an example of an embodiment of a container and lift system which may be utilized in combination with a vehicle as contemplated by this invention, illustrating an auger utilized to move material to multiple containers within the material storage area.

FIG. 7 is an elevation perspective view of an example of an embodiment of a container and lift system which may be utilized in combination with a vehicle as contemplated by this invention, illustrating one or more augers 143 utilized to move material to multiple containers 151 and 152 within the material storage area. FIG. 7 also shows lift hood 142. The box portion of the container and lift system may include any one of a number of different types of framework 145 within the contemplation of this invention. The side door 146 at the rear end of the container and lift system provides access to bin storage and other interior features. FIG. 7 further identifies floor 154 within the material storage area, wherein said floor may be a traditional type of floor (such as a wood floor) or a walking or moving (active) floor which would be utilized to move or unload material from the material storage area 141.

Figure 8:
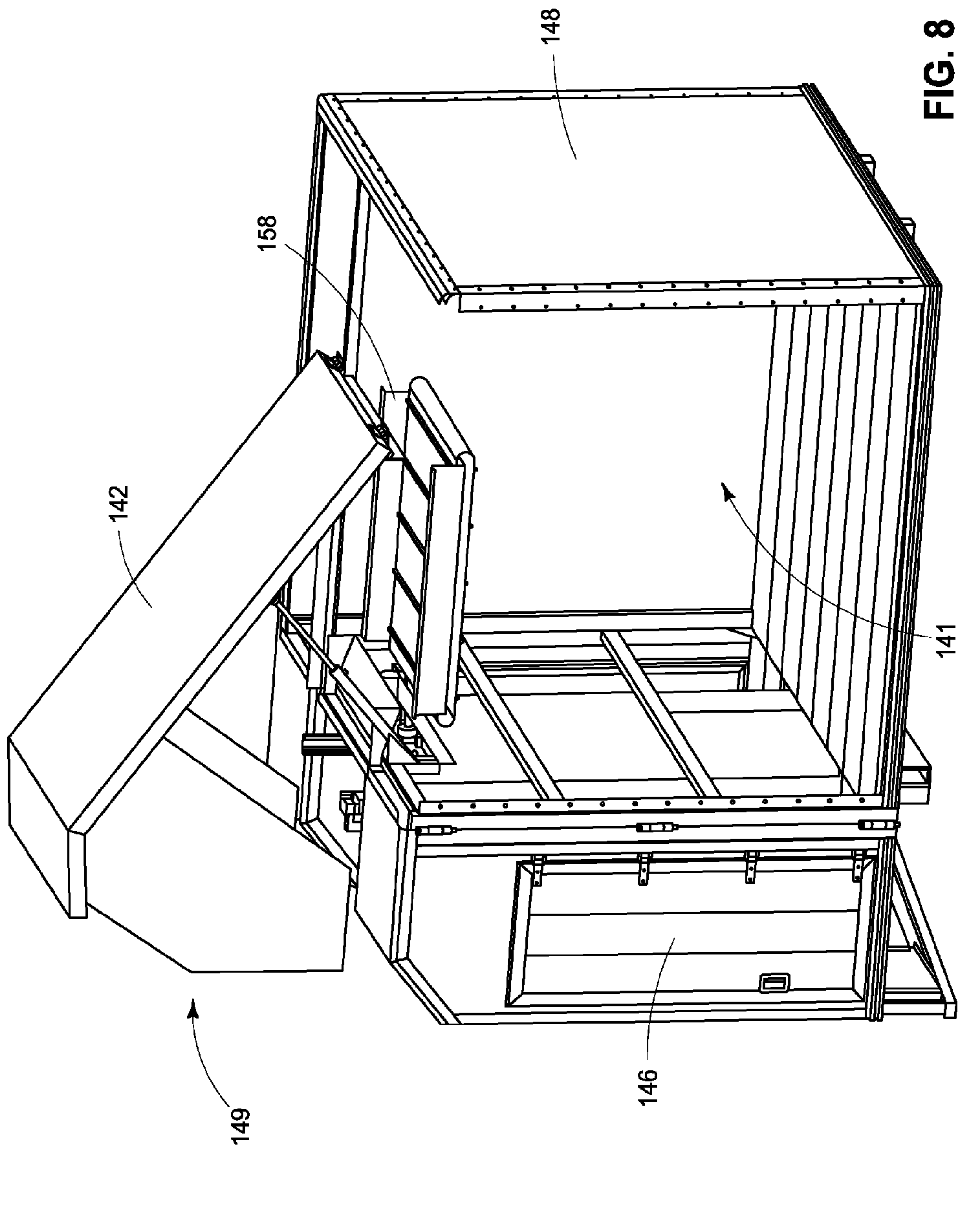
FIG. 8 is an elevation perspective view of an example of an embodiment of a container and lift system which may be utilized in combination with a vehicle as contemplated by this invention, illustrating the conveyor utilized without separate storage containers within the material storage area.

FIG. 8 is an elevation perspective view of an example of an embodiment of a container and lift system which may be utilized in combination with a vehicle as contemplated by this invention, illustrating a conveyor 158 utilized in combination with a single material storage area 141. FIG. 8 also shows overhead lift cover system 149, lift hood 142 and the front end 148 of the box or vehicle container. The side door 146 at the rear end of the container and lift system provides access to bin storage and other interior features.

Figure 9:
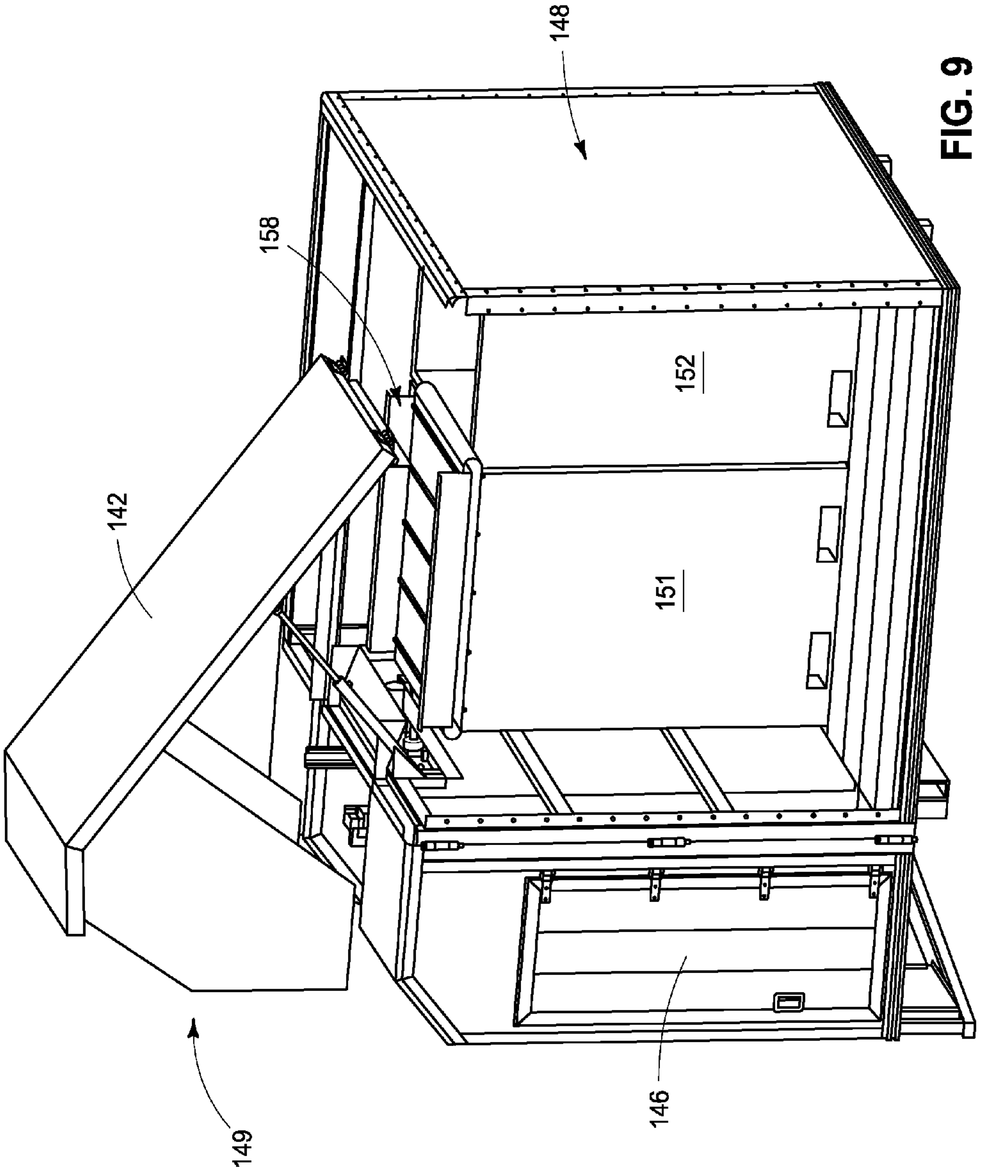
FIG. 9 is an elevation perspective view of an example of an embodiment of a container and lift system which may be utilized in combination with a vehicle as contemplated by this invention, illustrating how a conveyor may be utilized with one or more material containers.

FIG. 9 is an elevation perspective view of an example of an embodiment of a container and lift system which may be utilized in combination with a vehicle as contemplated by this invention, illustrating a conveyor 158 which may be utilized with one or more material containers 151 and 152. FIG. 9 also shows overhead lift cover system 149, lift hood 142 and the front end 148 of the box or vehicle container. The side door 146 at the rear end of the container and lift system provides access to bin storage and other interior features.

Figure 10:
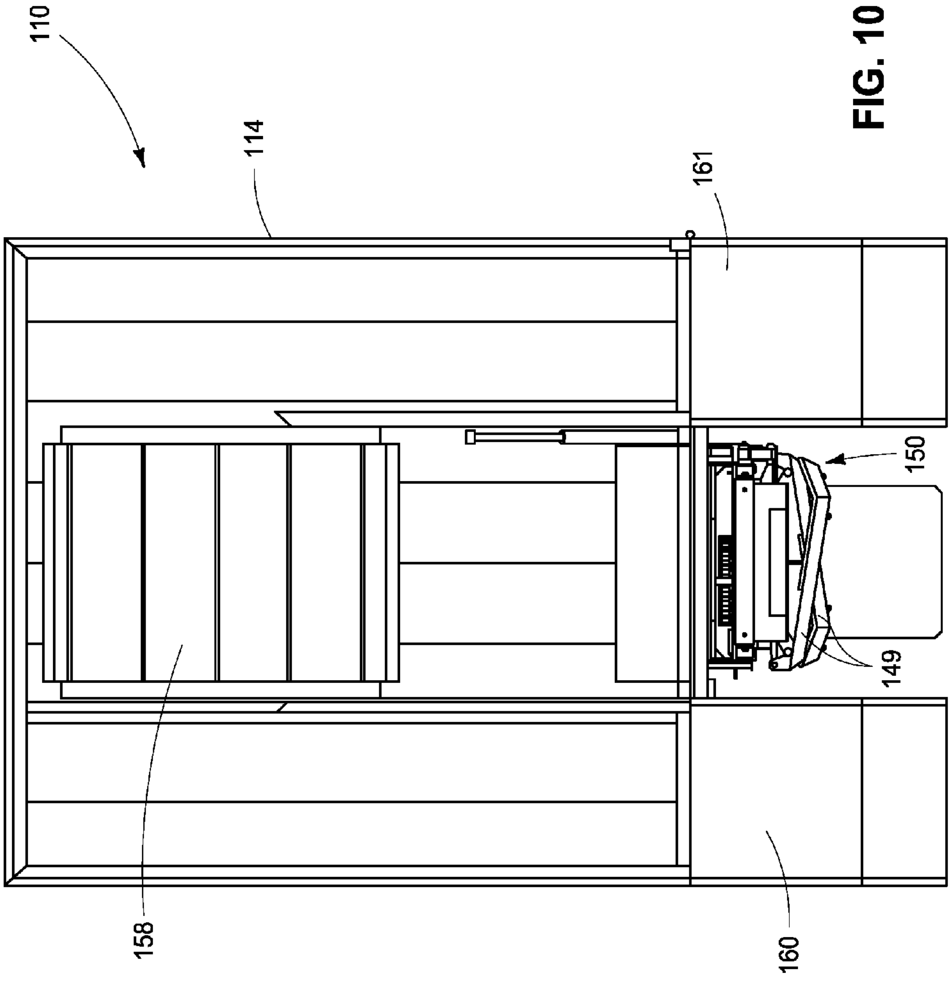
FIG. 10 is a rear elevation view of an example of an embodiment of a container and lift system which may be utilized in combination with a vehicle as contemplated by this invention, illustrating a conveyor in a front position and two-position bin lift with gripper style arms.

FIG. 10 is a rear elevation view of an example of an embodiment of a vehicle container and lift system 110 which may be utilized in combination with a vehicle as contemplated by this invention, illustrating container box framework 114, a conveyor 158 in a front position and two-position bin lift 150 with gripper style arms 149. In this aspect of the invention, two bin storage areas 160 and 161 are shown and provide a location where bins may be stored.

Figure 11:
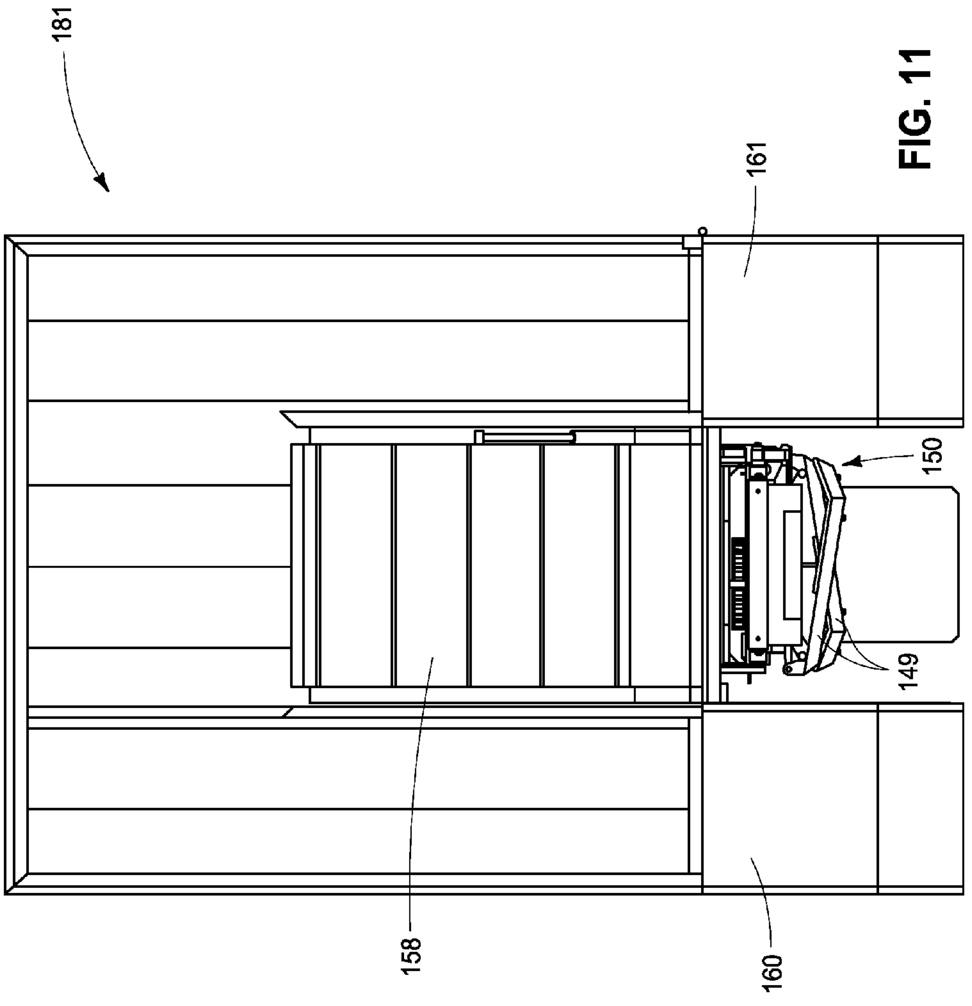
FIG. 11 is a rear elevation view of an example of an embodiment of a container and lift system which may be utilized in combination with a vehicle as contemplated by this invention, illustrating the conveyor at a rear position of the container and vehicle.

FIG. 11 is a rear elevation view of an example of an embodiment of a container and lift system 181 which may be utilized in combination with a vehicle as contemplated by this invention, illustrating the conveyor 158 at a rear position of the container, lift mechanism 150 with a two position bin lift with gripper style arms 149. FIG. 11 also shows the two bin storage areas 160 and 161.

Figure 12:
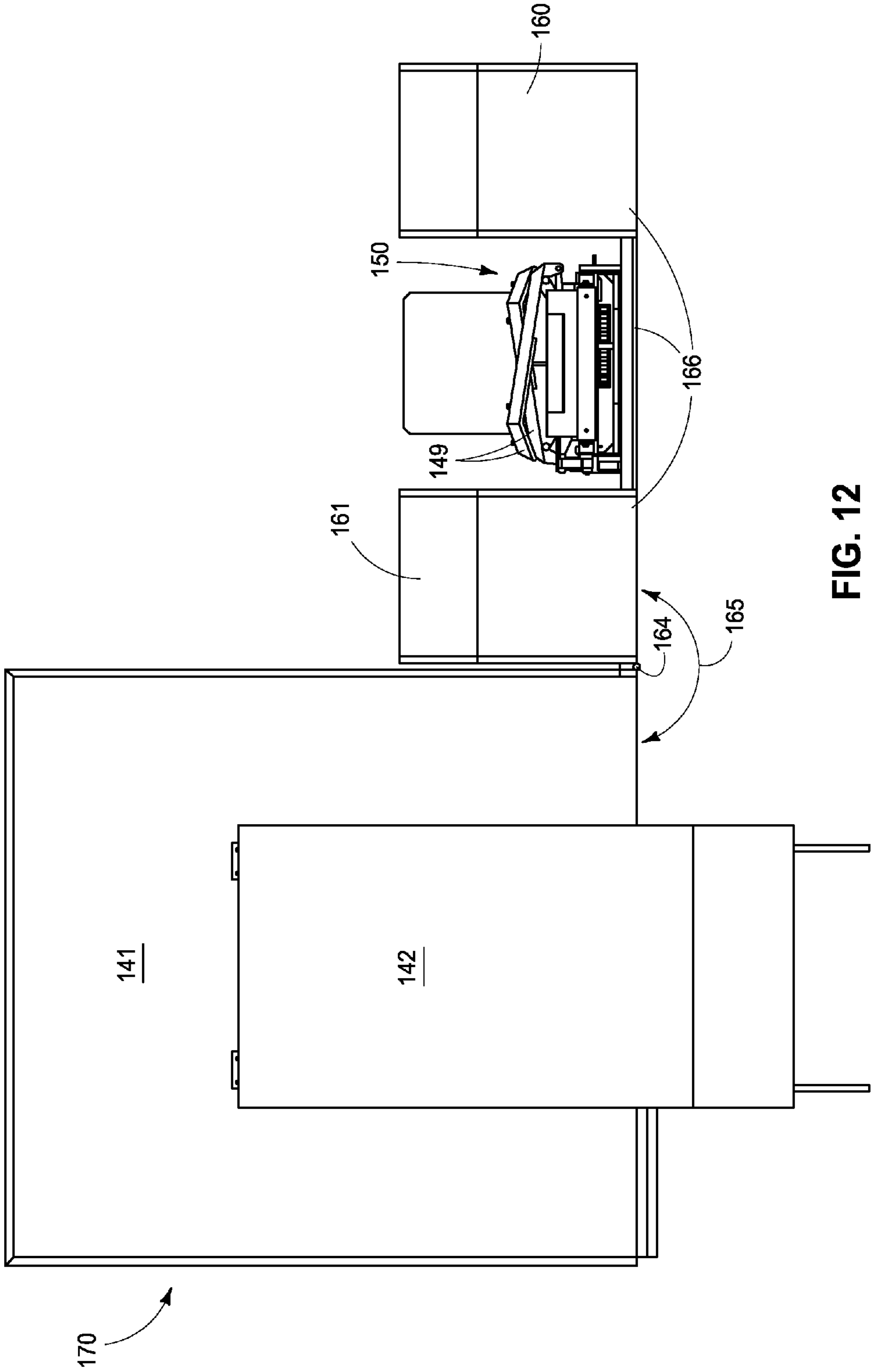
FIG. 12 is a top view of an example of an embodiment of a container and lift system which may be utilized in combination with a vehicle as contemplated by this invention, illustrating bin storage and a two position lift with gripper style arms and the swing-away section open.

FIG. 12 is a top view of an example of an embodiment of a container and lift system 170 which may be utilized in combination with a vehicle as contemplated by this invention, illustrating material storage area 141, lift hood 142, bin storage areas 160 and 161, and a two position lift mechanism 150 with gripper style arms 149. In this aspect of this embodiment of the invention, the been storage and lift mechanism are mounted on a framework 166 that pivots relative to the container storage framework about axis 164 as indicated by arrow 165, to allow unloading and other functions through the rear end of the truck if desired.

Figure 13:
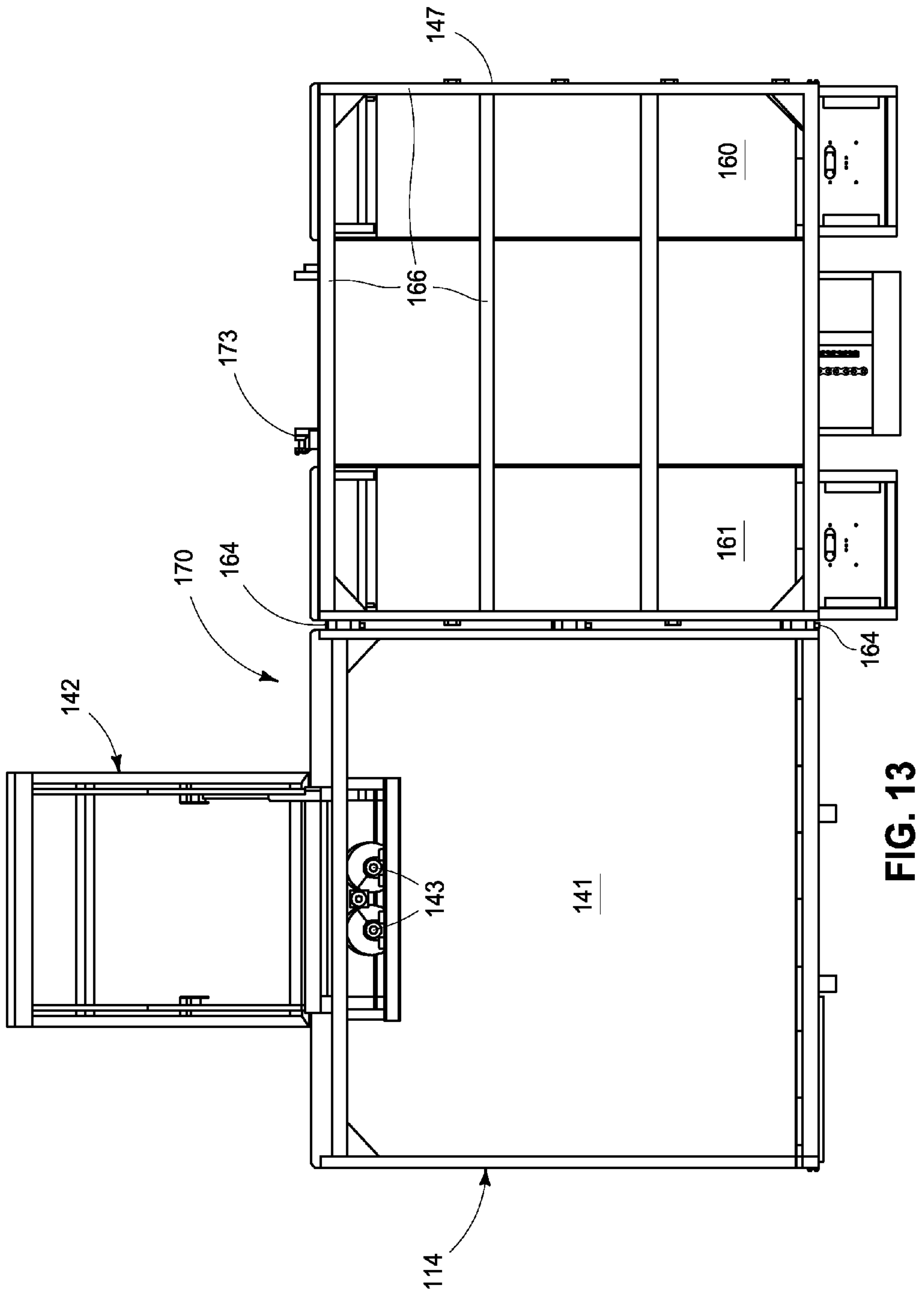
FIG. 13 is an elevation end view of an example of an embodiment of a container and lift system which may be utilized in combination with a vehicle as contemplated by this invention, illustrating the material storage area with a swing away section open.

FIG. 13 is an elevation end view of an example of an embodiment of a container and lift system 170 which may be utilized in combination with a vehicle as contemplated by this invention, illustrating the material storage area 141, container box framework 114, lift hood 142, the internal side of bin storage areas 160 and 161, pivoting framework 166 and hinge or axis 164 about which pivoting framework 166 pivots.

Figure 14:
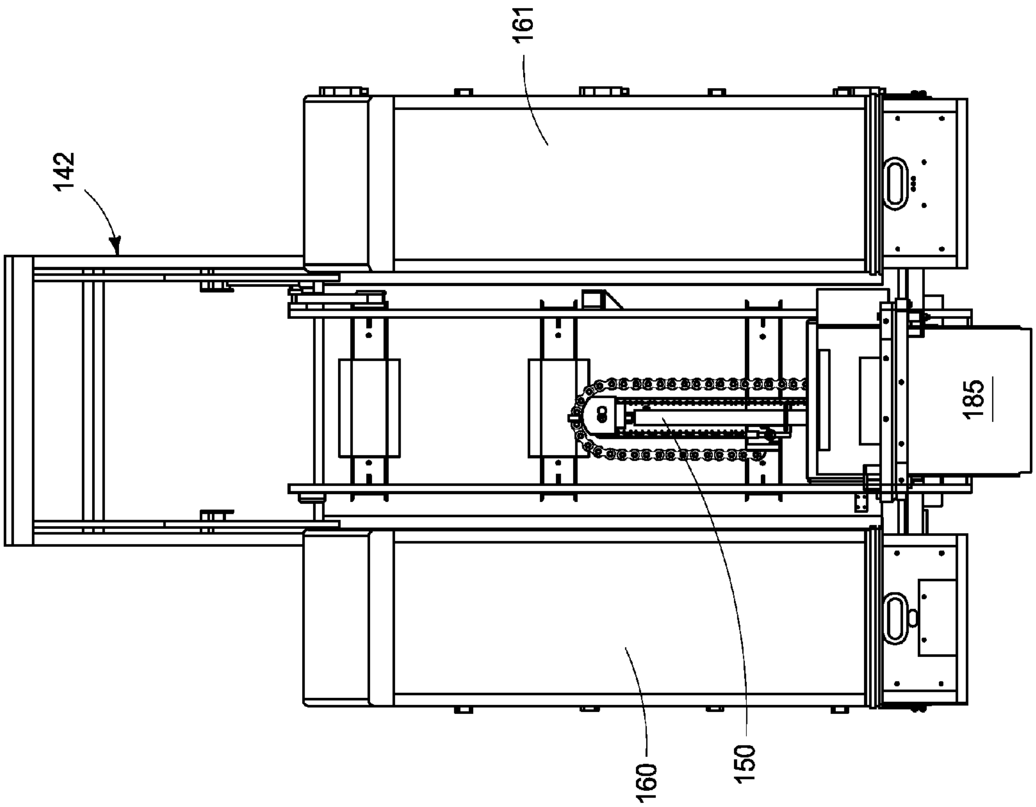
FIG. 14 is a rear elevation view of an example of an embodiment of a container and lift system which may be utilized in combination with a vehicle as contemplated by this invention, illustrating the two position lift in the ground position.

FIG. 14 is a rear elevation view of an example of an embodiment of a container and lift system which may be utilized in combination with a vehicle as contemplated by this invention, illustrating the two position lift 150 in the ground position with storage bin 185 contained therein, bin storage areas 160 and 161, and lift hood 142 in its upright position.

Figure 15:
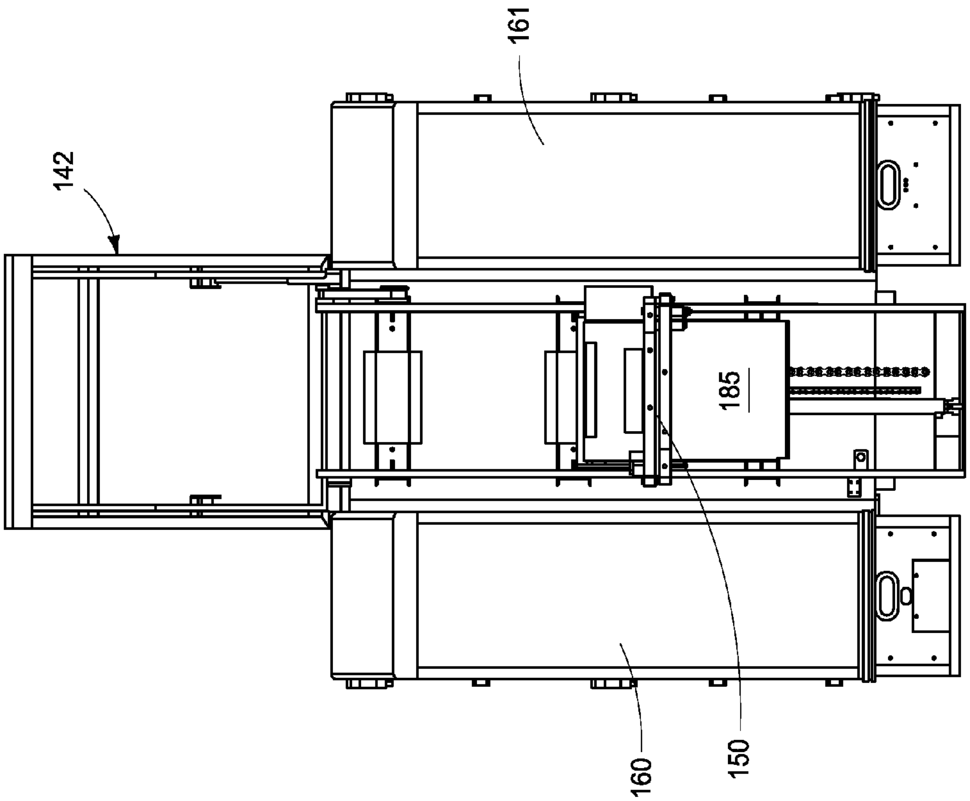
FIG. 15 is a rear elevation view of an example of an embodiment of a container and lift system which may be utilized in combination with a vehicle as contemplated by this invention, illustrating the two position lift in the dock height position.

FIG. 15 is a rear elevation view of an example of an embodiment of a container and lift system which may be utilized in combination with a vehicle as contemplated by this invention, illustrating the two position lift 150 in a more upper position with storage bin 185 contained therein, bin storage areas 160 and 161, and lift hood 142 in its upright position.

Figure 16:
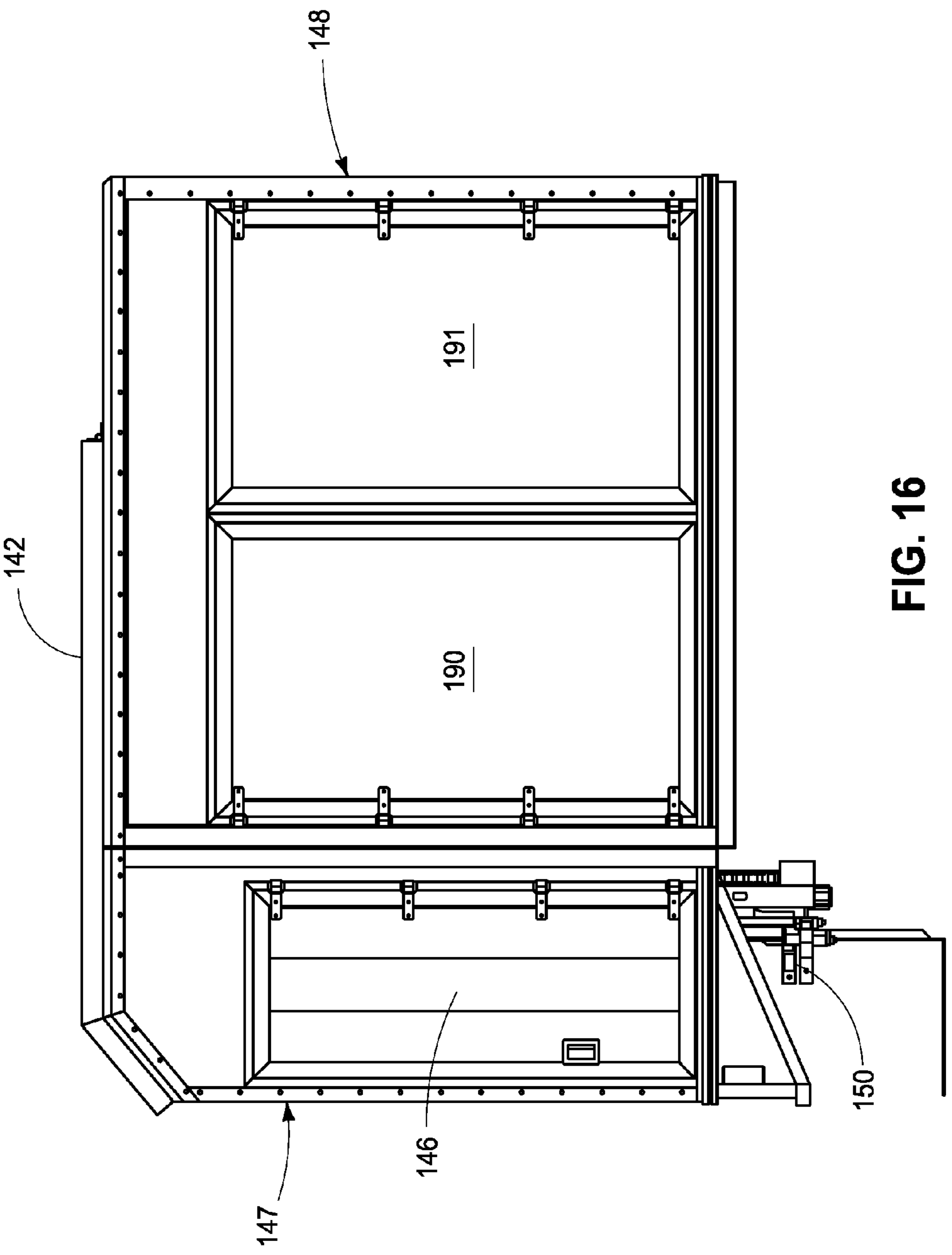
FIG. 16 is a side elevation view of an example of an embodiment of a container and lift system which may be utilized in combination with a vehicle as contemplated by this invention, illustrating side swing-out doors.

FIG. 16 is a side elevation view of an example of an embodiment of a container and lift system which may be utilized in combination with a vehicle as contemplated by this invention, illustrating side swing-out doors 190 and 191, front end 148 and rear end 147 of the container box, lift hood 142, access door 146 and lift mechanism 150. This aspect of this embodiment of the invention has side swing-out doors as an option for unloading the material that is accumulated within the material storage area and it may be removed through the swing-out doors any one of multiple ways, such as a dynamic removable floor, a push ram, or other ways known in the trade.

Figure 17:
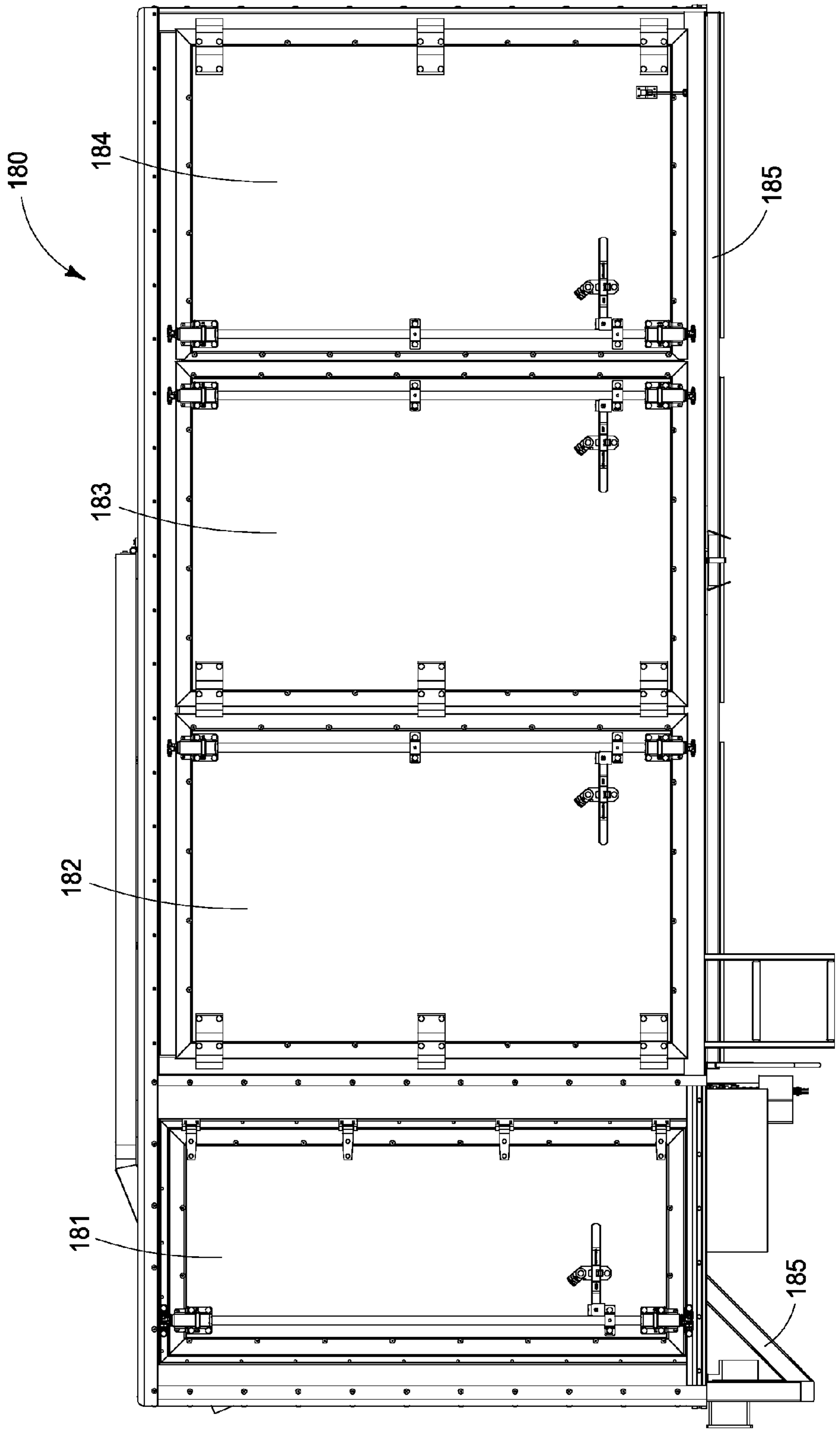
FIG. 17 is a side elevation view of another example of an embodiment of this invention showing the exterior of a storage or container configuration of a collection vehicle with three general storage or use areas.

FIG. 17 is a side elevation view of another example of an embodiment of this invention 180 showing the exterior of a storage or container configuration for a collection vehicle with three general storage or use areas, on a framework 185. This storage or container portion would be combined with a cab portion of the vehicle such as shown in prior figures.

FIG. 17 shows framework 185, first exterior door 181 which leads to a bin storage area, second exterior door 182 leading to an internal or interior storage compartment and a third set of doors 183 and 184 (double doors) which open to a third internal storage compartment or area.

Figure 18:
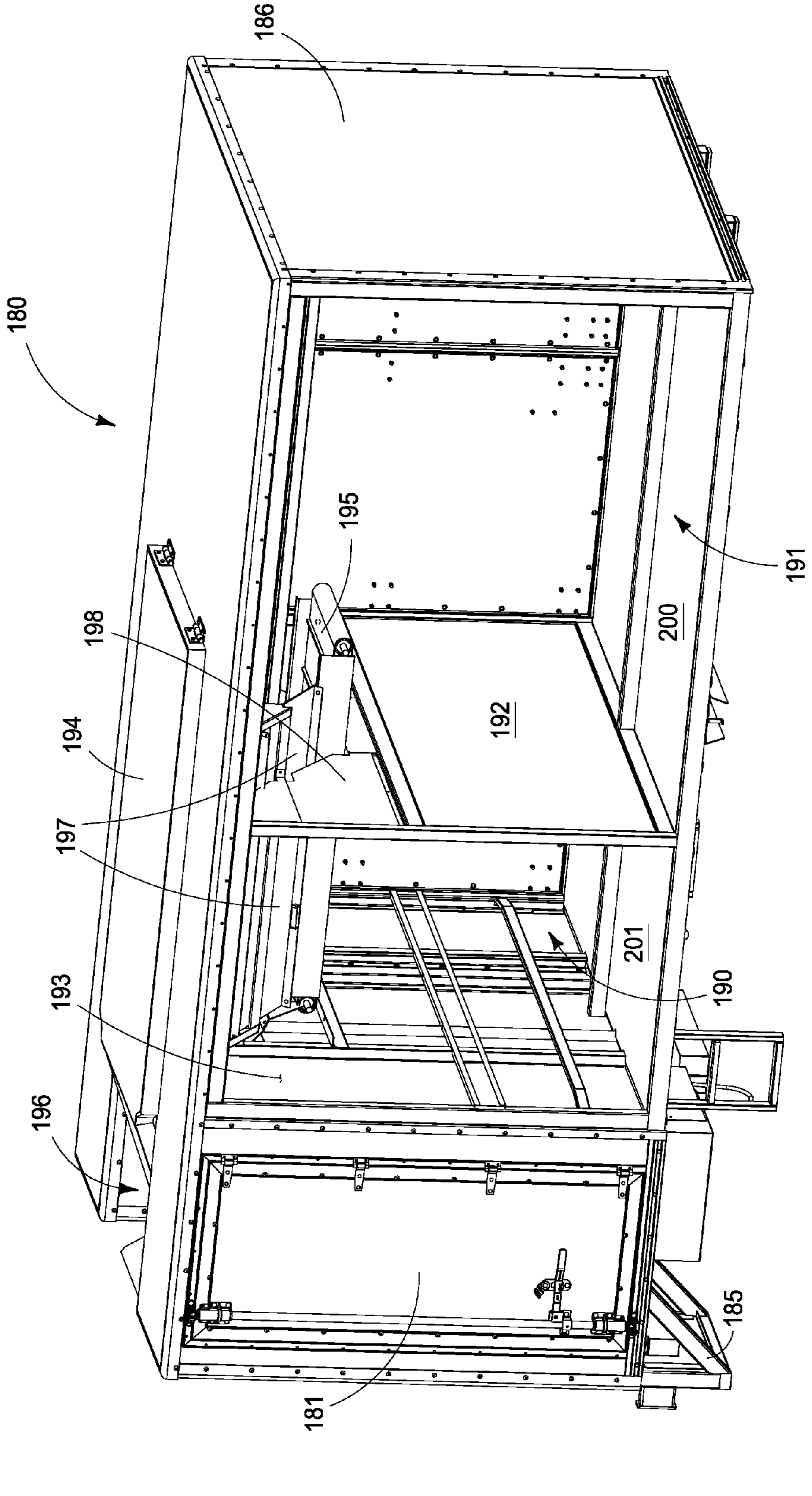
FIG. 18 is a side elevation perspective view of the interior of the example of the embodiment shown in FIG. 17, and illustrating a dual use storage area or compartment isolated from the loading and distribution conveyor.

FIG. 18 is a side elevation perspective view of the interior of the example of the embodiment of the invention 180 shown in FIG. 17, and illustrating a dual use storage area 190 with floor 201, first wall 193 and second wall 192. The floors in these embodiments may be any one of a number of different types of floors, such as a regular floor, or they may be a walking floor, as is generally known in the industry.

Second storage area 191 is shown positioned relative to material handling device 195 (a belt conveyor in this example, but it may also be a screw conveyor or other suitable material handling or transport device). The material handling device is positioned toward a top portion of the first storage area 190 and the second storage area 191 to allow more of the volume of the storage areas to be loaded with material and thereby providing a higher capacity with the roof loading system.

FIG. 18 illustrates how the material feed or material delivery device 195, in this example a belt conveyor, is positioned to receive material from the top portion of the container such as shown in prior figures, and deliver it to the selected storage areas or compartments.

Movable barrier 197 is shown in place in FIG. 18 to prevent, limit or control the material being delivered on the material handling device 195, from entering the first storage area 190. Barrier 197 would be placed over a material passageway that would otherwise provide passage for material being loaded or on the conveyor to pass into the first storage area. There may but need not be another similar barrier on the other side of the material handling device. In this configuration with the material barriers 197 in place, the first storage area 190 may be used to haul or store things other than the material being collected by the collection vehicle as that material is delivered only to second storage area 191 via material handling device (a belt conveyor in this example). The ability to use the first and/or second storage areas for dual or multiple purposes through the use of the movable barrier has advantages in the use of the collection vehicle and provides its users maximum flexibility. Additional wall barrier 198 may also be utilized to further separate the first storage area 190 from the second storage area 191.

In FIG. 18 the material handling device is configured to deliver material to either or both of the first storage area (or first containment area) or the second storage area (or the second containment area), depending if the barrier 197 is in its first position as shown in FIG. 18, or in its second position out of the way so as not to block or pose a barrier to material from the material handling device to the first storage or containment area.

The second position of the barriers 197 may be such that the barriers are completely removed, or it may be such that the barriers 197 have been slid or rotated away to create or open the passageways through which material may pass to be deposited in the storage or containment area.

It should be noted and appreciated that in some embodiments of this invention, the material may be loaded from the front or side of the front of the truck instead of the rear, with the material handling device then moving the material toward the rear of the vehicle container and the components being essentially reversed within the vehicle container, all within the contemplation of embodiments of this invention.

Figure 19:
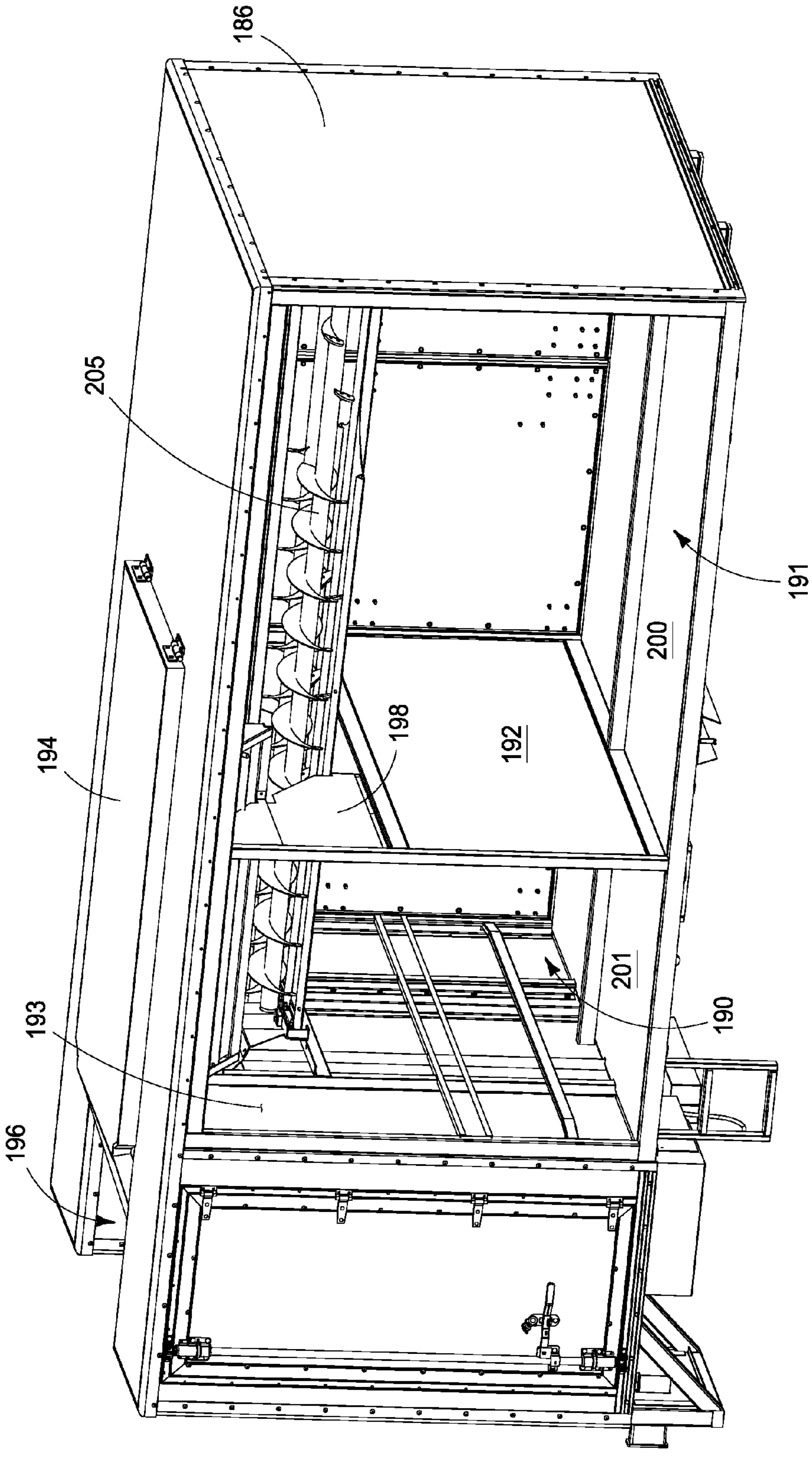
FIG. 19 is a side elevation perspective view of the interior of a storage or container configuration, and illustrating a screw conveyor but with the dual use area open to received material from the material handling conveyor.

FIG. 19 is a side elevation perspective view of the interior of a storage or container configuration, and illustrating an auger 205 (material transport device) to move the material. FIG. 19 further shows the embodiment wherein the movable barriers (item 197 in FIG. 18 for example) have been moved up out of the passageway thereby allowing or facilitating the movement of material into the first storage area 190. FIG. 19 illustrates one of the multiple uses that can be made of the first storage area 190 in embodiments of this invention. FIG. 19 shows the auger positioned to feed material to the second storage area 191. All like numbered items are the same as in prior figures and the descriptions will not be repeated here.

It will also be noted that while the container or bin lift mechanism is shown on the rear of the truck container in FIG. 19, which may be preferred with smaller trucks, it may also be located on the side of the truck container toward the front of the truck on larger or longer truck containers, all within the contemplation of this invention.

Figure 20:
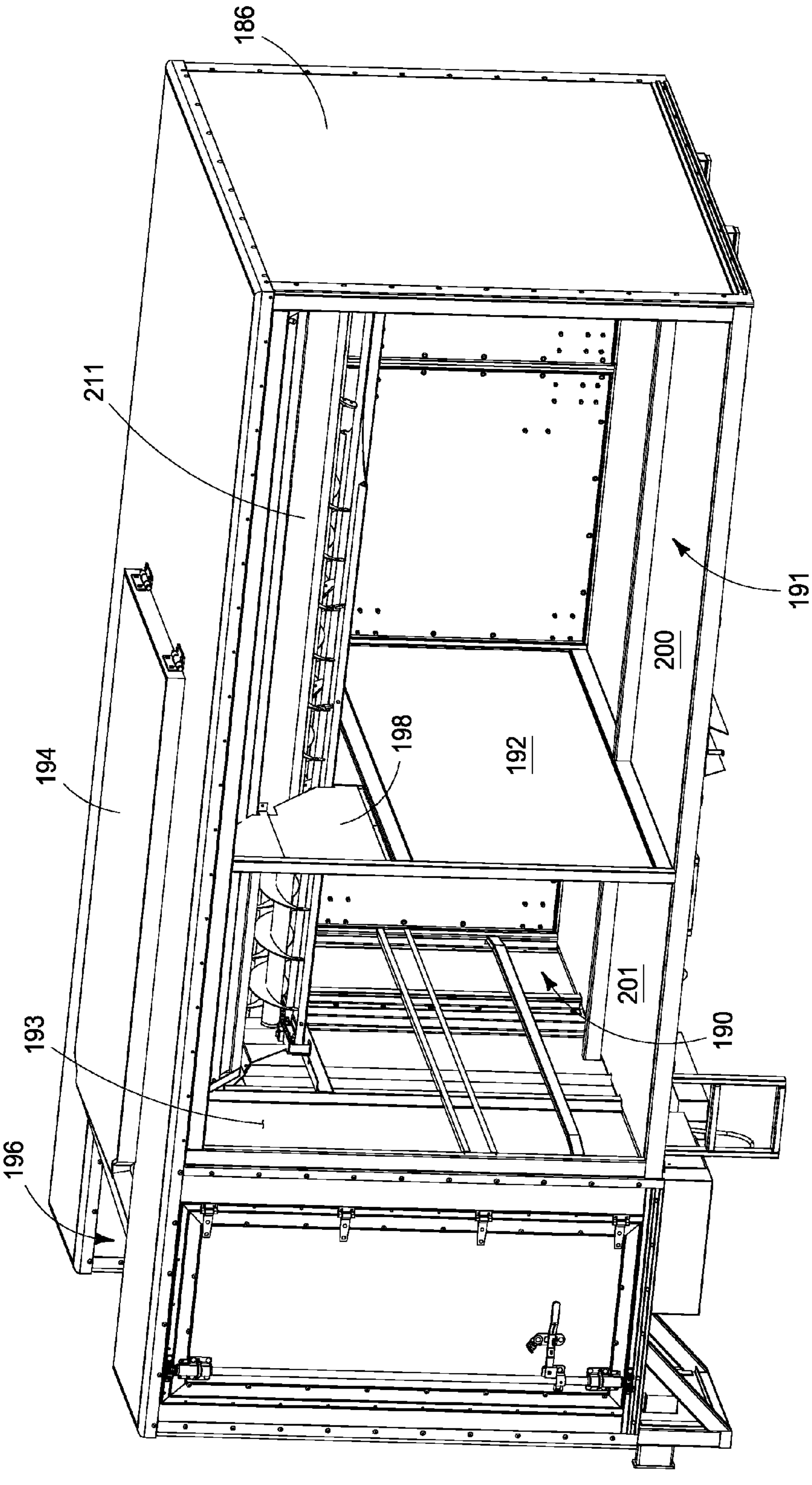
FIG. 20 is a side elevation perspective view of the interior of a storage or container configuration, and illustrating a screw conveyor but with the dual use area being in the front, i.e. the second storage compartment.

FIG. 20 illustrates another example of an embodiment of the invention illustrated in FIG. 19, only wherein a movable material barrier 211 is used combined with barrier 198 to load the first storage area 190 and block material from entering the second storage area 191. All like numbered items are the same as in prior figures and the descriptions will not be repeated here.

As will be appreciated by those of reasonable skill in the art, there are numerous embodiments to this invention, and variations of elements, components and combinations, which may be used, all within the scope of this invention. For example the material may be loaded in the middle of the container portion of the truck with augers or material handling devices moving the material both toward storage areas in the front and in the back, also utilizing barriers to render storage areas readily capable of multiple uses; or the material may be loaded in the front (which would generally be from the side of the container towards or at the front end), with the material handling devices working in the opposite direction from that shown for example in FIG. 19, all within the contemplation of this invention.

Further, several of the drawings and figures herein show the container portion of the vehicle to illustrate the options, though they are to be mounted on vehicles for use.

One embodiment of this invention, for example, is a collection and delivery vehicle comprising: a vehicle chassis; at least four wheels rotatably attached to said vehicle chassis; a driver's cab directly or indirectly attached to said vehicle chassis; a container box with a framework mounted to said vehicle chassis; a bin lift mechanism mounted to the container box and disposed to receive a bin containing material, lift the material bin to a top portion of the container box, and deposit the material from the bin to a material transport device at the top portion of the container box; and wherein the material transport device is configured to transport the material from a top portion of the container box and deposit the material into a material storage area within the container box.

In addition to the embodiment(s) described in the preceding paragraph, the collection and delivery vehicle may further be configured wherein the material transport device is a conveyor or an auger, and further wherein the material transport device is further configured to transport the material from a top portion of the container box and deposit the material into one of multiple containers within the material storage area within the container box.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A collection and delivery vehicle comprising:

a vehicle chassis;

at least four wheels rotatably attached to said vehicle chassis;

a driver's cab directly or indirectly attached to said vehicle chassis;

a container with a framework mounted to said vehicle chassis;

a material transport device stationary relative to the framework and located within a top portion of the container, and which is one of an auger or a belt conveyor which comprises at least in part an auger or a belt;

a bin lift mechanism mounted to the container and disposed to receive a bin containing material, lift the bin to the top portion of the container, and deposit the material from the bin onto the auger or belt of the material transport device;

wherein the material transport device is configured to transport the material from a top portion of the container and deposit the material into a material storage area within the container;

wherein the container includes a first storage area and a second storage area and the material transport device is configured to deliver material to either or both of the first storage area or the second storage area; and a material barrier configured around the material transport device in the first storage area, such that when the barrier is in a first position it prevents material being delivered via the material transport device to the second storage area from being delivered into the first storage area, and when the barrier is in a second position, material being transported by the material transport device may be delivered to the first storage area.

2. A collection and delivery vehicle as recited in claim 1 and further wherein the material transport device is a belt conveyor or an auger, and further wherein the material transport device is further configured to transport the material from a top portion of the container and deposit the material into one of the first or second storage areas within the container.

3. A collection and delivery vehicle comprising:

a vehicle chassis;

at least four wheels rotatably attached to said vehicle chassis;

a driver's cab directly or indirectly attached to said vehicle chassis;

a container with a framework mounted to said vehicle chassis;

a material transport device mounted at the top portion of the container, the material transport device being stationary relative to the container, and is one of an auger or a belt conveyor which comprises at least in part an auger or a belt;

a bin lift mechanism mounted to the container and disposed to receive a bin containing material, lift the bin to a top portion of the container, and deposit the material from the bin onto the auger or belt of the material transport device;

the vehicle container including a first storage area and a second storage area under the material transport device;

wherein the material transport device is configured to transport the material and deposit the material into one or both of the first storage area or the second storage area within the container; and within the container.

4. A collection and delivery vehicle as recited in claim 3, and further comprising:

a material barrier configured around the material transport device in the first storage area, such that when the barrier is in a first position it prevents material being delivered via the material transport device to the second storage area from being delivered into the first storage area, and when the barrier is in a second position, material being transported by the material transport device may be delivered to the first storage area.

5. A collection and delivery vehicle as recited in claim 3 and further wherein the material transport device is further configured to transport the material from a top portion of the container and deposit the material into one of the first or second storage areas within the container.

* * * * *